(12) United States Patent
Nguyen et al.

(10) Patent No.: US 9,111,389 B2
(45) Date of Patent: Aug. 18, 2015

(54) IMAGE GENERATION APPARATUS AND IMAGE GENERATION METHOD

(75) Inventors: Khang Nguyen, Osaka (JP); Pongsak Lasang, Singapore (SG); Kyaw Kyaw Win, Singapore (SG); Sheng Mei Shen, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 13/808,388

(22) PCT Filed: May 7, 2012

(86) PCT No.: PCT/JP2012/002991
§ 371 (c)(1),
(2), (4) Date: Jan. 4, 2013

(87) PCT Pub. No.: WO2012/153513
PCT Pub. Date: Nov. 15, 2012

(65) Prior Publication Data
US 2013/0106848 A1 May 2, 2013

(30) Foreign Application Priority Data

May 12, 2011 (JP) ................................ 2011-107632

(51) Int. Cl.
*G06T 15/20* (2011.01)
*H04N 13/00* (2006.01)
*G06T 5/00* (2006.01)

(52) U.S. Cl.
CPC .............. *G06T 15/205* (2013.01); *G06T 5/005* (2013.01); *H04N 13/0011* (2013.01); *G06T 2207/10028* (2013.01)

(58) Field of Classification Search
None
See application file for complete search history.

(56) References Cited

U.S. PATENT DOCUMENTS 5,262,856 A * 11/1993 Lippman et al. ......... 375/240.12
5,886,353 A * 3/1999 Spivey et al. ............ 250/370.09
(Continued)

FOREIGN PATENT DOCUMENTS

JP 2001-256482 9/2001
JP 2006-512833 4/2006
(Continued)

OTHER PUBLICATIONS

International Search Report issued Jul. 24, 2012 in International (PCT) Application No. PCT/JP2012/002991.
(Continued)

*Primary Examiner* — Said Broome
(74) *Attorney, Agent, or Firm* — Wenderoth, Lind & Ponack, L.L.P.

(57) ABSTRACT

An image generation apparatus includes: a pixel-shifted image generation unit which generates a first pixel-shifted image resulting from a process of shifting, based on an input image and a depth map, a pixel in the input image by a shift amount corresponding to the new viewpoint, and a second pixel-shifted image resulting from a process of shifting, by the same shift amount as for the first pixel-shifted image, a pixel in a background edge image included in the input image and containing a pixel located in a background region around an edge of a foreground object; an image fusion unit which fuses the second pixel-shifted image and the first pixel-shifted image to include a background region in the second pixel-shifted image into a hole; and a hole filling unit which fills the hole with pixel information based on the fused pixel-shifted image.

15 Claims, 15 Drawing Sheets

(56) References Cited

U.S. PATENT DOCUMENTS

| | | | |
|---|---|---|---|
| 7,616,885 | B2 | 11/2009 | Chen et al. |
| 7,689,031 | B2 | 3/2010 | Berretty et al. |
| 7,840,070 | B2 | 11/2010 | Ernst et al. |
| 8,253,740 | B2 | 8/2012 | Varekamp et al. |
| 2006/0078180 | A1 | 4/2006 | Berretty et al. |
| 2008/0187222 | A1 | 8/2008 | Ernst et al. |
| 2009/0115780 | A1 | 5/2009 | Varekamp et al. |
| 2011/0002550 | A1* | 1/2011 | Takada .......................... 382/218 |
| 2011/0261050 | A1* | 10/2011 | Smolic et al. ................. 345/419 |

FOREIGN PATENT DOCUMENTS

| | | |
|---|---|---|
| JP | 2007-25861 | 2/2007 |
| JP | 2008-521081 | 6/2008 |
| JP | 2009-528587 | 8/2009 |
| WO | 2004/059991 | 7/2004 |
| WO | 2006/054200 | 5/2006 |
| WO | 2007/096816 | 8/2007 |
| WO | 2010/037512 | 4/2010 |
| WO | 2010/087751 | 8/2010 |

OTHER PUBLICATIONS

Leonard McMillan et al., "Image-Based Rendering: A New Interface Between Computer Vision and Computer Graphics", ACM Siggraph Computer Graphics, vol. 33, No. 4, pp. 61-64, Nov. 1999.

Christoph Fehn, "Depth-Image-Based Rendering (DIBR), Compression, and Transmission for a New Approach on 3D-TV", Stereoscopic Displays and Virtual Reality Systems XI (Proceedings of SPIE), vol. 5291, No. 1, May 2004, pp. 93-104.

Daniel Scharstein et al., "Learning Conditional Random Fields for Stereo", IEEE Conference on Computer Vision and Pattern Recognition (CVPR 2007), Jun. 2007.

Heiko Hirschmuller et al., "Evaluation of Cost Functions for Stereo Matching", IEEE Conference on Computer Vision and Pattern Recognition (CVPR 2007), Jun. 2007.

Ayako Hirano et al., "Support system of 2D video contents to 3D conversion", ITE Technical Report, vol. 27, No. 64, Nov. 12, 2003, p. 19-22.

Extended European Search Report issued Nov. 14, 2014 in corresponding European Application No. 12782990.1.

Fons Bruls et al., "Proposal to amendment MPEG-C Part 3", International Organisation for Standardistaion, ISO/IEC JTC1/SC29/WG11, Coding of Moving Pictures and Audio, Jul. 1, 2007, pp. 1-7, XP002464367.

Yannick Morvan et al., "Design Considerations for View Interpolation in a 3D Video Coding Framework", Jun. 1, 2006, pp. 1-8, XP002515048.

Carlos Vázquez et al., "Stereoscopic Imaging: Filling Disoccluded Areas in Depth Image-Based Rendering", Proceedings of SPIE, vol. 6392, Oct. 17, 2006, pp. 1-12, XP002444224.

* cited by examiner

FIG. 8

| 602 | | | | 654 |
|---|---|---|---|---|
| 162 | 110 | 79 | 79 | 79 |
| 175 | 167 | 109 | 79 | 79 |
| 175 | 175 | 174 | 115 | 81 |
| 175 | 175 | 175 | 175 | 119 |
| 175 | 175 | 175 | 175 | 175 |

650, 652, 610

| 604 | | | | 664 |
|---|---|---|---|---|
| 166 | 110 | 91 | 90 | 89 |
| 164 | 130 | 95 | 90 | 89 |
| 164 | 162 | 156 | 127 | 102 |
| 162 | 162 | 162 | 162 | 159 |
| 162 | 162 | 162 | 162 | 162 |

660

| 606 | | | | 666 |
|---|---|---|---|---|
| 166 | 110 | 91 | 90 | 89 |
| 164 | 130 | 95 | 90 | 89 |
| 164 | 162 | 89 | 127 | 102 |
| 162 | 162 | 162 | 162 | 159 |
| 162 | 162 | 162 | 162 | 162 |

662

IMAGE GENERATION APPARATUS AND IMAGE GENERATION METHOD

TECHNICAL FIELD

The present invention relates generally to image processing, and particularly to a method and an apparatus for generating stereoscopic/multi-view images.

BACKGROUND ART

Three-dimensional (3D) images can be generated using a single image view and its corresponding depth map in a conventionally known Depth-Image-Based Rendering (DIBR) technique (for example, PTL 1).

CITATION LIST

Patent Literature

[PTL 1] US patent application publication No. 2009/0115780

Non Patent Literature

[NPL 1] L. McMillan & S. Gortle: "Image-Based Rendering: A New Interface Between Computer Vision and Computer Graphics", Computer Graphics, Vol. 33, No. 4 (November 1999)

[NPL 2] C. Fehn: "Depth-Image-Based Rendering (DIBR), Compression and Transmission for a New Approach on 3D-TV", Proceedings of SPIE Stereoscopic Displays and Virtual Reality Systems XI, 5291: 93-104 (2004)

SUMMARY OF INVENTION

Technical Problem

However, there is a problem of an increase in boundary artifacts between a foreground object and a background in the image generated in the DIBR technique.

Thus, the present invention has an object to provide an image generation apparatus capable of reducing the boundary artifacts between the foreground object and the background which are produced when a new image is generated in the DIBR technique.

Solution to Problem

In order to solve the above problem, an image generation apparatus according to an aspect of the present invention is an image generation apparatus for generating, based on an input image and a depth map corresponding to the input image, an image of a new viewpoint of a scene represented in the input image, the apparatus comprising: a pixel-shifted image generation unit configured to generate a first pixel-shifted image and a second pixel-shifted image, the first pixel-shifted image resulting from a process of shifting, based on the input image and the depth map, a pixel in the input image by a shift amount corresponding to the new viewpoint, the second pixel-shifted image resulting from a process of shifting a pixel in a background edge image by the same shift amount as for the first pixel-shifted image, and the background edge image being included in the input image and containing a designated edge pixel that is a pixel located in a background region around an edge of a foreground object; an image fusion unit configured to fuse the second pixel-shifted image and the first pixel-shifted image to include a background region in the second pixel-shifted image into a hole that is a region having no pixel information and created in the first pixel-shifted image in the process of shifting the pixel; and a hole filling unit configured to fill the hole with pixel information based on the fused pixel-shifted image.

It is to be noted that the present invention can be implemented not only as the above image generation apparatus, but also as an image generation method which includes, as steps, characteristic units included in the image generation apparatus, and as a program which causes a computer to execute such characteristic steps. It goes without saying that such a program can be distributed via a recoding medium such as a compact disc read only memory (CD-ROM) and a communication medium such as the Internet.

Furthermore, the present invention can be implemented as a semiconductor integrated circuit (LSI) which provides a part or all of the functions of the above image generation apparatus, or as an image generation system which includes the above image generation apparatus.

Advantageous Effects of Invention

According to the present invention, it is possible to provide an image generation apparatus which is capable of reducing boundary artifacts between a foreground object and a background.

BRIEF DESCRIPTION OF DRAWINGS

FIG. 8 is an illustration of an example of a background edge image according to an embodiment of the present invention.

DESCRIPTION OF EMBODIMENT (Underlying Knowledge Forming Basis of the Present Invention)

The inventors found that the following problems occur in the 3D image generation technique described in the "Background Art" section.

Generally, an image of a new viewpoint of a certain scene can be generated using a rendering (DIBR) technique based on a depth image. An input image of an original viewpoint of the certain scene and the corresponding depth image (which is referred to also as a depth map) representing a distance of objects in the scene are used to synthesize the new viewpoint, which is also known as view synthesis.

In this view synthesis approach, a new image view is generated based on camera geometries using information on a camera position of the original viewpoint and a new camera position of the new viewpoint. Here, the new image view refers to a newly synthesized image of a viewpoint which is different from the viewpoint of the input image. The new synthesized image views can be used to represent a left eye view image and a right eye view image for stereoscopic 3D viewing. The multi-view images can also be generated for multi-view 3D displays. Therefore, by using the DIBR technique, the 3D images can be generated using only one image view and its corresponding depth map.

During the new view generation, a hole is generated in an occluded region. Here, the hole refers to an unknown area that does not include pixel information and is empty. This is due to the fact that the region that is occluded in the original viewpoint is visible (disocclude) in the new viewpoint. It is therefore necessary to apply a hole filling method to an image with the hole.

A well-known hole filling method is based on bilinear interpolation which uses pixels on the both sides of the hole for interpolation. This method works well for a small hole region. However, for a large hole, this method often produces blurred edges, boundary artifacts, and distorted objects. Such 3D is low in quality. The methods, such as symmetric or asymmetric depth map smoothing, are disclosed in the art for reducing the size of the hole. However, such methods cause geometric distortion of objects, which suppresses 3D effects.

Figure 3:
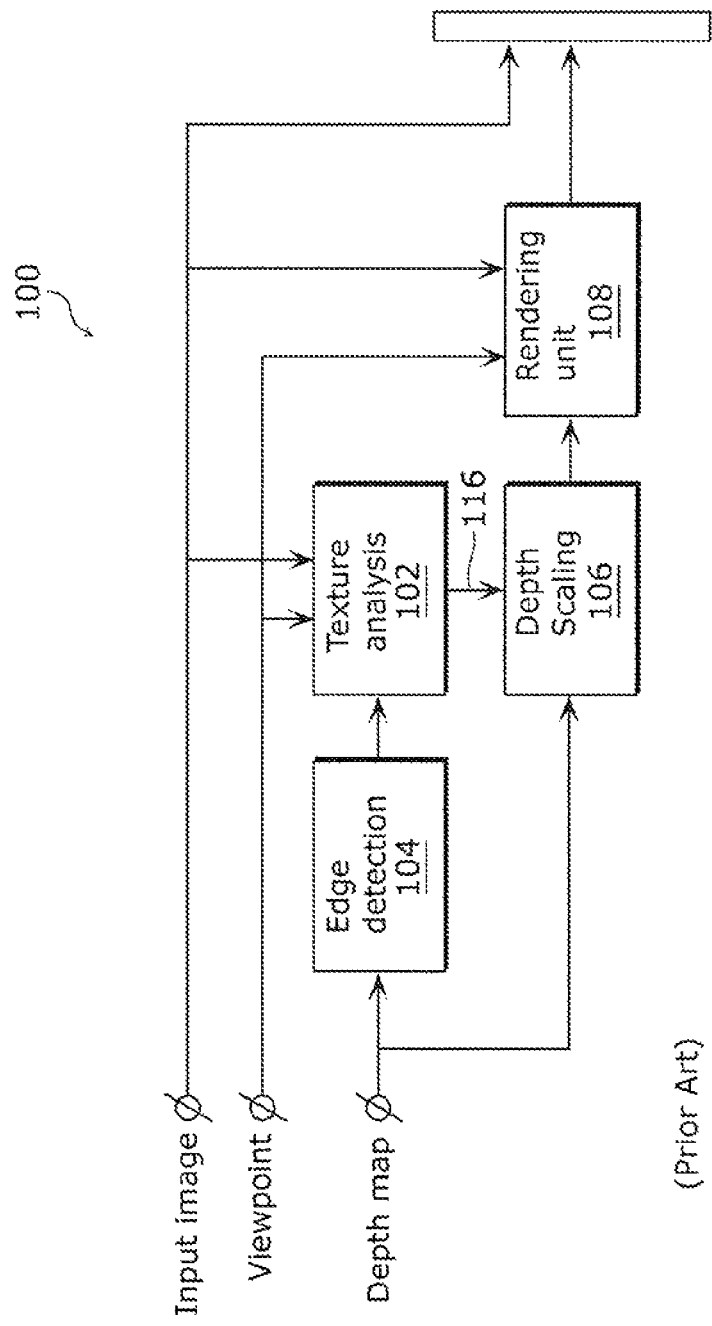
FIG. 3 is a schematic diagram of an image rendering unit according to the prior art.

Another method is disclosed in Patent Literature (PTL) 1. An image generation apparatus 100 shown in FIG. 3 according to a related art detects an edge of the depth map at edge detection 104. At texture analysis 102, the texture of the input image is then analyzed for computing a measure of variation in pixel values in regions of the input image corresponding to the neighborhood of the edge. At depth scaling 106, the depth map is scaled down according to the variation measure. An output image is finally rendered at a rendering unit 108. By scaling down the depth map at the depth scaling 106, the method reduces the hole size in the high textured area. Thus, the rendering artifact can be reduced. However, the 3D effect may be suppressed. Furthermore, the known methods do not take care of the edges of an object accurately. The known methods tend to extend foreground object edges and produce boundary artifacts. Accordingly, the 3D quality is degraded.

In order to solve the above problem, an image generation apparatus according to an aspect of the present invention is an image generation apparatus for generating, based on an input image and a depth map corresponding to the input image, an image of a new viewpoint of a scene represented in the input image, the apparatus comprising: a pixel-shifted image generation unit configured to generate a first pixel-shifted image and a second pixel-shifted image, the first pixel-shifted image resulting from a process of shifting, based on the input image and the depth map, a pixel in the input image by a shift amount corresponding to the new viewpoint, the second pixel-shifted image resulting from a process of shifting a pixel in a background edge image by the same shift amount as for the first pixel-shifted image, and the background edge image being included in the input image and containing a designated edge pixel that is a pixel located in a background region around an edge of a foreground object; an image fusion unit configured to fuse the second pixel-shifted image and the first pixel-shifted image to include a background region in the second pixel-shifted image into a hole that is a region having no pixel information and created in the first pixel-shifted image in the process of shifting the pixel; and a hole filling unit configured to fill the hole with pixel information based on the fused pixel-shifted image.

With this, in the fused pixel-shifted image, a pixel value included in the peripheral region of the hole is a pixel value included in the background region. Accordingly, when the image generation apparatus fills the hole, the pixel value included in the background region is used. This makes it possible to reduce boundary artifacts between the foreground object and the background.

Specifically, the image generation apparatus may further comprise a background edge image generation unit including: an edge detection module which detects an edge included in the input image and an edge included in the depth map; an edge filtering module which aligns a first edge image and a second edge image, the first edge image indicating edge information included in the input image, and the second edge image indicating edge information included in the depth map; and a generation module which generates the background edge image by replacing, based on the edge included in the input image after the aligning and the edge included in the depth map after the aligning, a pixel value of the edge included in the input image with a pixel value of a pixel indicating a maximum depth position within a predetermined range from, on the depth map, a position corresponding to a position of the edge included in the input image.

Furthermore, the edge filtering module may determine a first edge pixel and a second edge pixel, and align the first edge image and the second edge image by matching a position of one of the first edge pixel and the second edge pixel to a position of the other, the first edge pixel indicating the edge within a predetermined region in one of the first edge image and the second edge image, and the second pixel being closest in distance to the first edge pixel among pixels indicating the edge within the predetermined region in the other of the first edge image and the second edge image.

With this, a positional difference between the input image and the depth map is corrected so that a more accurate background edge image can be generated.

Furthermore, it may be that, in each of the first edge image and the second edge image, the edge has two or more pixels in a width direction.

With this, when the generated background edge image is shifted, pixel values included in the background region can be provided on both sides of the hole.

Furthermore, it may be that, among the pixels of the edge in the width direction, at least one pixel is included in the foreground object, and at least one other pixel is included in the background region.

For example, the edge detection module may include an edge detector included in a group of a Canny edge detector, a Prewitt edge detector, a Sobel edge detector, a Laplacian of Gaussian edge detector, and other differential edge detectors.

Furthermore, the pixel-shifted image generation unit may calculate the shift amount based on the depth map and at least one parameter indicating a gain of the shift amount.

With this, for example, when a stereoscopic image is generated, a parameter indicating a gain of the shift amount is adjusted so that an amount imaged forward or backward in stereoscopic viewing can be adjusted.

For example, the image fusion unit may fuse the second pixel-shifted image onto the first pixel-shifted image by replacing a pixel value of the first pixel-shifted image with a corresponding pixel value of the second pixel-shifted image.

Furthermore, the image fusion unit may fuse the second pixel-shifted image onto the first pixel-shifted image based on a weighted average of pixel values.

This allows the two pixel-shifted images to be fused more appropriately.

For example, it may be that the hole filling unit fills the hole with the pixel information by performing a total variation (TV) inpainting process on the fused pixel-shifted image.

Furthermore, the hole filling unit may fill the hole with the pixel information in the TV inpainting process based on a change rate of pixel values which is computed using neighborhood pixels.

This allows the hole filling unit to perform the hole filling process at higher speed.

Furthermore, the hole filling unit may further perform, on the fused pixel-shifted image which has the hole filled by the hole filling unit, a process of smoothing a boundary of the foreground object based on a similarity of pixel values around the boundary and a depth degree indicated by the depth map.

It is to be noted that these general or specific aspects may be implemented using a system, a method, an integrated circuit, a computer program, or a recoding medium, or any combination of systems, methods, integrated circuits, computer programs, or recording media.

As described above, an object of the present invention is to provide a method and an apparatus for generating a new image view. The method and the apparatus can produce accurate object boundaries and reduce boundary artifacts while preserving the shape of foreground objects. Thus, it is possible to obtain improved image quality and therefore produce greater 3D effects.

Furthermore, the present invention provides a method and an apparatus for generating a new image view which can be used for 3D applications. In the present invention, the method fuses the background information to the pixel-shifted input image while preserving the shape of a foreground object, ensuring both sides of the hole containing background pixels. Next, hole filing is performed. The advantage is that the accuracy of object boundaries in the output image is improved and distortion is reduced. This makes it possible to produce greater 3D effects.

Furthermore, in an embodiment of the present invention, the background edge image is generated from the input image and the edge information of both the input image and the depth map. The depth error around object boundaries in the depth map is filtered out using the edge information from the input image. The advantage is that the boundary artifact of foreground objects in the output is reduced.

Furthermore, in an embodiment of the present invention, an approximated inpainting method for hole filling is used. A coefficient is added to improve the convergence rate and reduce the number of iterations while a similar pixel output inpainting result is obtained. The advantage is that the computational time can be significantly reduced comparing to a conventional inpainting method.

An image generation apparatus according to an aspect of the present invention is specifically described below with reference to the drawings. The embodiment described below shows a specific example of the present invention. The numerical values, shapes, structural elements, the arrangement and connection of the structural elements, steps, the processing order of the steps etc. shown in the following embodiment are mere examples, and therefore do not limit the present invention. Among the structural elements in the following embodiment, structural elements not recited in the independent claims which define the broadest concept are described as arbitrary structural elements.

(Embodiment)

First, in order to specifically explain the effects of the present invention, a difference between an image generated using an image generation apparatus according to an embodiment of the present invention and an image generated in a related art of the present invention is described with reference to FIGS. 1 and 2.

Figure 1:
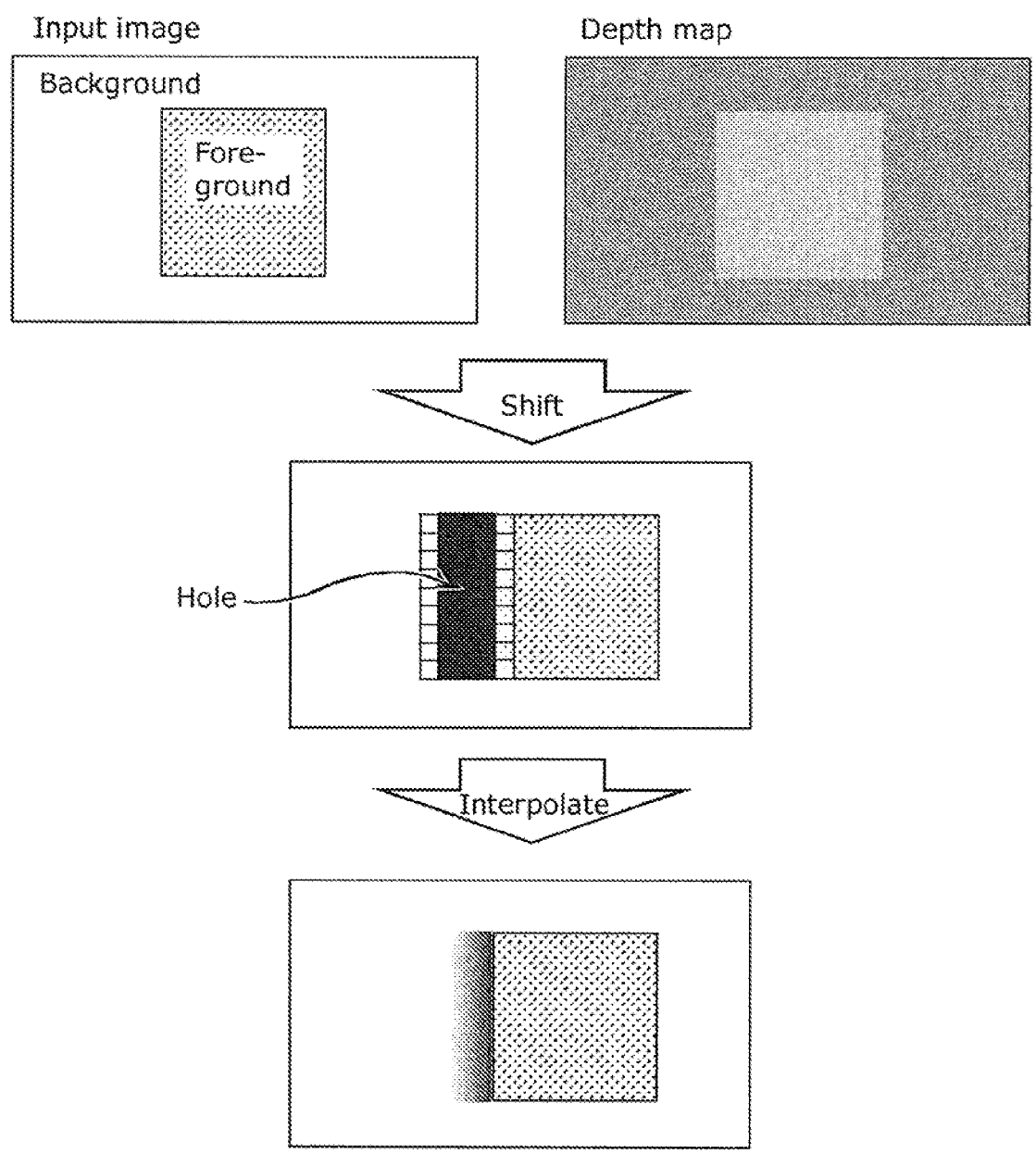
FIG. 1 shows a concept of a new image view generated in a related art of the present invention.

FIG. 1 shows a concept of a new image view generated in the related art of the present invention.

Here, first, an input image and a depth map corresponding to the input image are synthesized using the IBR technique into a new image view of a viewpoint shifted leftward. In other words, an image view is generated by shifting a foreground rightward relative to a background in the input image. In this image view, a hole, which is a region having no pixel information, is present for a shift amount of the foreground.

Thus, in the related art, the hole is filled based on pixel information on the neighborhood of the left edge of the hole and pixel information on the neighborhood of the right edge of the hole. Here, the pixel information on the neighborhood of the left edge of the hole is pixel information on the background. The pixel information on the neighborhood of the right edge of the hole is pixel information on the foreground. This results in artifacts in the boundary between the left edge of the foreground and the background as shown in FIG. 1.

Figure 2:
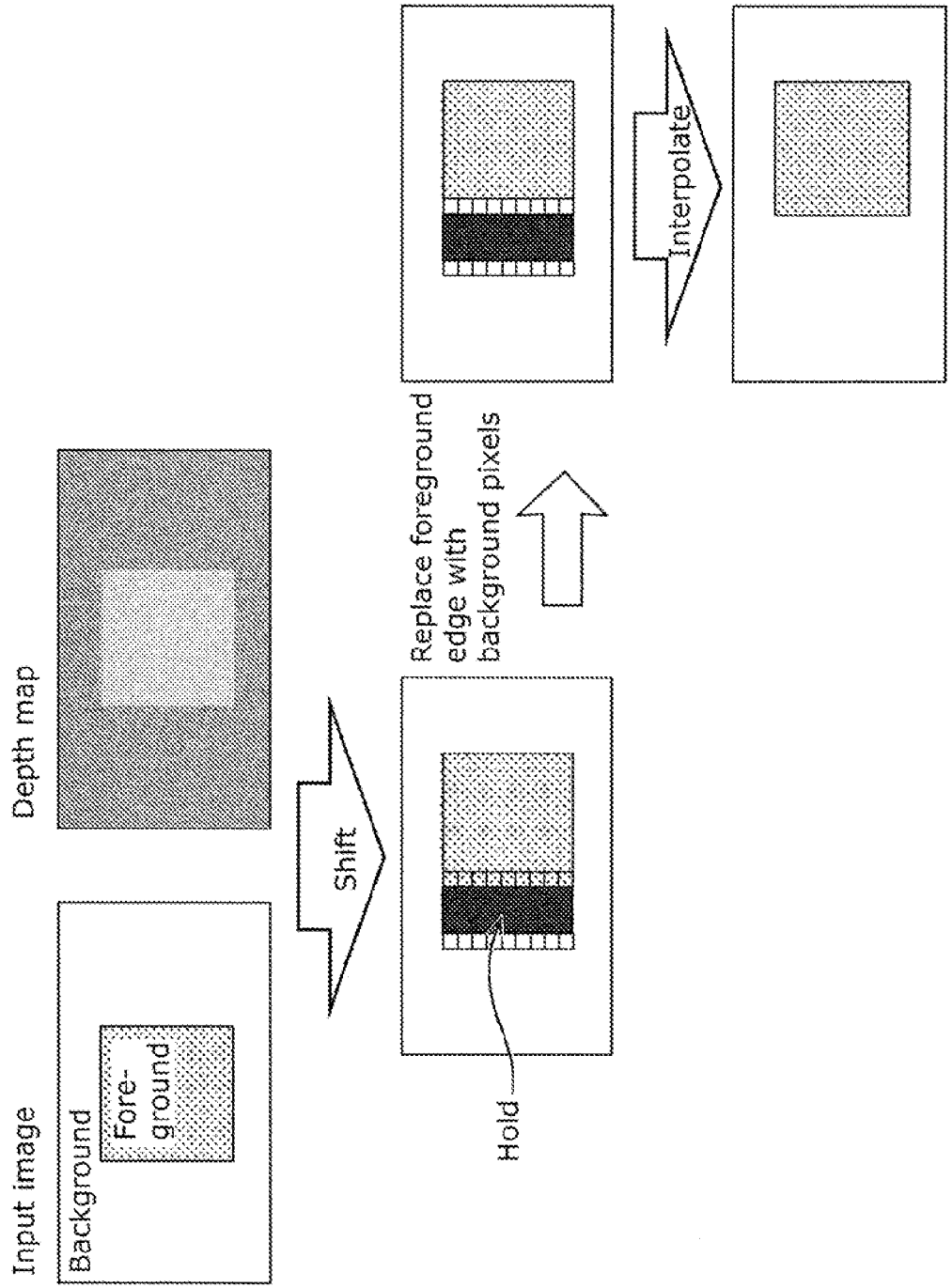
FIG. 2 shows a concept of a new image view generated in an image generation apparatus according to an embodiment of the present invention.

FIG. 2 shows a concept of a new image view generated in an image generation apparatus according to this embodiment.

As shown in FIG. 2, the image generation apparatus according to this embodiment uses only the pixel information on the background when filling the hole. Thus, the image generation apparatus performs the filling after replacing the pixel information on the foreground with the pixel information on the background in the neighborhood to the right of the hole. As a result, no artifacts appear in the boundary between the left edge of the foreground and the background even when a new image view is generated.

Next, a structure of the image generation apparatus according to this embodiment is described.

Figure 4:
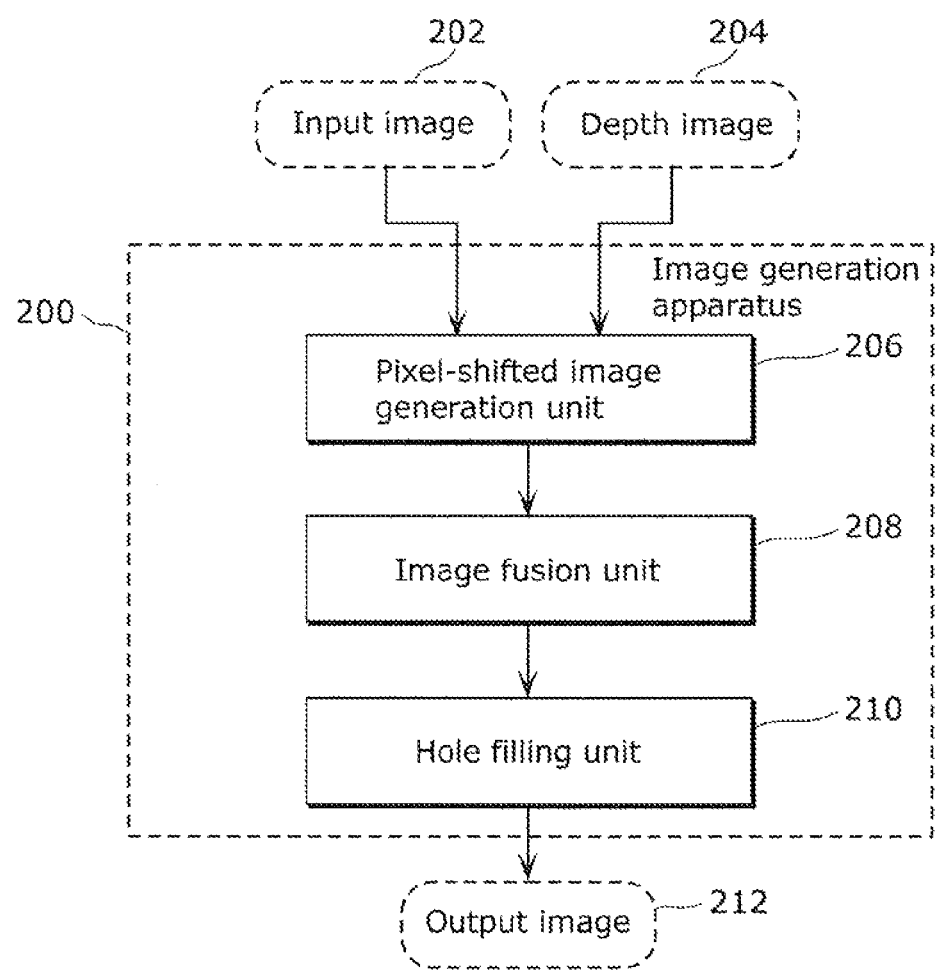
FIG. 4 is a block diagram illustrating an apparatus for generating a new image view according to the present invention.

FIG. 4 illustrates an example of a block diagram of an image generation apparatus 200. The image generation apparatus 200 generates, based on an input image and a depth map corresponding to the input image, a new image of a new viewpoint of a scene represented in the input image.

As shown in FIG. 4, the image generation apparatus 200 includes a pixel-shifted image generation unit 206, an image fusion unit 208, and a hole filling unit 210.

The pixel-shifted image generation unit 206 generates a first pixel-shifted image resulting from a process of shifting, based on the input image and the depth map, pixels in the input image by a shift amount corresponding to the new viewpoint. Furthermore, the pixel-shifted image generation unit 206 generates a second pixel-shifted image resulting from a process of shifting, by the same shift amount as for the first pixel-shifted image, a corresponding pixel in a background edge image included in the input image and containing a designated edge pixel that is a pixel in a background region around an edge of a foreground object.

The image fusion unit 208 fuses the second pixel-shifted image and the first pixel-shifted image so that a background region included in the second pixel-shifted image is included in the hole that is a region having no pixel information and created in the first pixel-shifted image in the process of shifting the pixel.

The hole filling unit 210 fills the hole with pixel information based on the fused pixel-shifted image.

More specific descriptions are given below.

The image generation apparatus 200 obtains an input image 202 and a depth map 204. The depth map 204 includes information indicating a distance between scene objects in the input image. The pixel-shifted image generation unit 206 generates the first pixel-shifted image and the second pixel-shifted image based on the input image 202 and the depth map 204.

Here, the first pixel-shifted image is an image which is generated by applying the DIBR technique to the input image and has a viewpoint shifted. In other words, the first pixel-shifted image is an image resulting from the process of shifting, based on the input image and the depth map, the pixels in the input image by the shift amount corresponding to the new viewpoint.

The second pixel-shifted image is an image resulting from the process of shifting, by the same shift amount as for the first pixel-shifted image, the corresponding pixel in the background edge image included in the input image and containing the designated edge pixel that is a pixel located in the background region around the edge of the foreground object.

The amount of pixel shift is derived based on the depth map 204. The image fusion unit 208 fuses information on the second pixel-shifted image onto the first-pixel shifted image to generate the fused pixel-shifted image. Finally, the hole filling unit 210 fills the missing pixels in the fused pixel-shifted image using the information around the hole region, to obtain an output image 212.

Structural elements of the image generation apparatus 200 are typically achieved in the form of integrated circuits (IC), application-specific integrated circuits (ASIC), large scale integrated (LSI) circuits, and digital signal processors (DSP), or achieved by CPU-based processors, such as ARM, and machines including personal computers (PC). Each of these modules can be in many single-function LSIs, or also can be in one integrated LSI. The name used here is LSI, but it may also be called IC, system LSI, super LSI, or ultra LSI in accordance with the degree of integration. Moreover, ways to achieve integration is not only LSI, but also a special circuit or a general purpose processor and so forth can achieve the integration. This includes a specialized microprocessor such as a digital signal processor (DSP) that can be directed by the program instruction. A field programmable gate array (FPGA) that can be programmed after manufacturing LSI or reconfigurable processor that can re-configure the connection or configuration of LSI can be used for the same purpose. In the future, with advancement in manufacturing and process technology, a brand-new technology may replace LSI. The integration can be done by that technology. In the implementation, the image generation apparatus 200 may be embedded into an image capturing device such as a digital still camera and a movie camera. The apparatus 200 may also be implemented in a standalone device to work with an image capturing system such as in a professional capturing system. The implementation of the image generation apparatus 200 in other types of device is also possible and does not limit the scope of the present invention.

Figure 5:
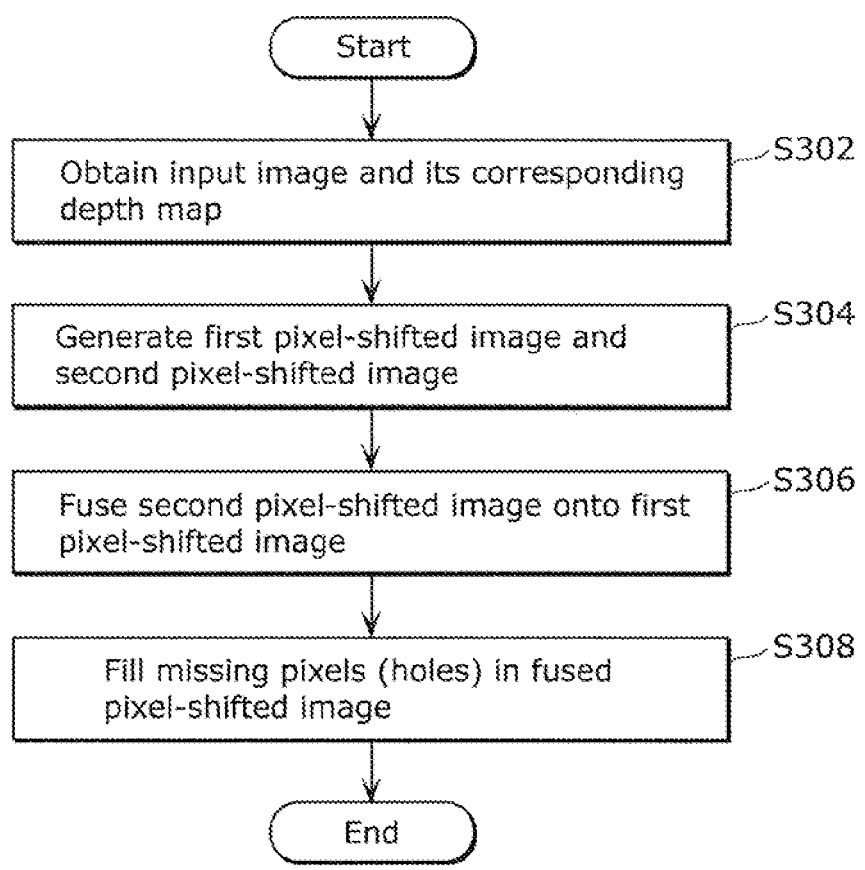
FIG. 5 is a flowchart illustrating a method for generating a new image view according to the present invention.

FIG. 5 shows a flow of process which the image generation apparatus 200 performs.

First, the image generation apparatus 200 obtains the input image and the depth map at Step S302.

Next, the image generation apparatus 200 generates the first pixel-shifted image and the second pixel-shifted image based on the input image and the depth map at Step S304. The second pixel-shifted image contains the designated edge pixels obtained from the pixels of the background region around the edges of foreground objects.

Next, at Step S306, the image generation apparatus 200 fuses the second pixel-shifted image onto the first pixel-shifted image so that the background information from the second pixel-shifted image is fused onto the first pixel-shifted image while preserving the shape of foreground objects.

Finally, at Step S308, the image generation apparatus 200 fills the missing pixels in the fused pixel-shifted image utilizing the background information in the fused pixel-shifted image, to obtain an output image. By accurately fusing the background edge pixels to the foreground edge pixels in the image fusion process, the foreground object is accurately preserved and artifact is reduced. Therefore, the image quality improves.

Figure 6:
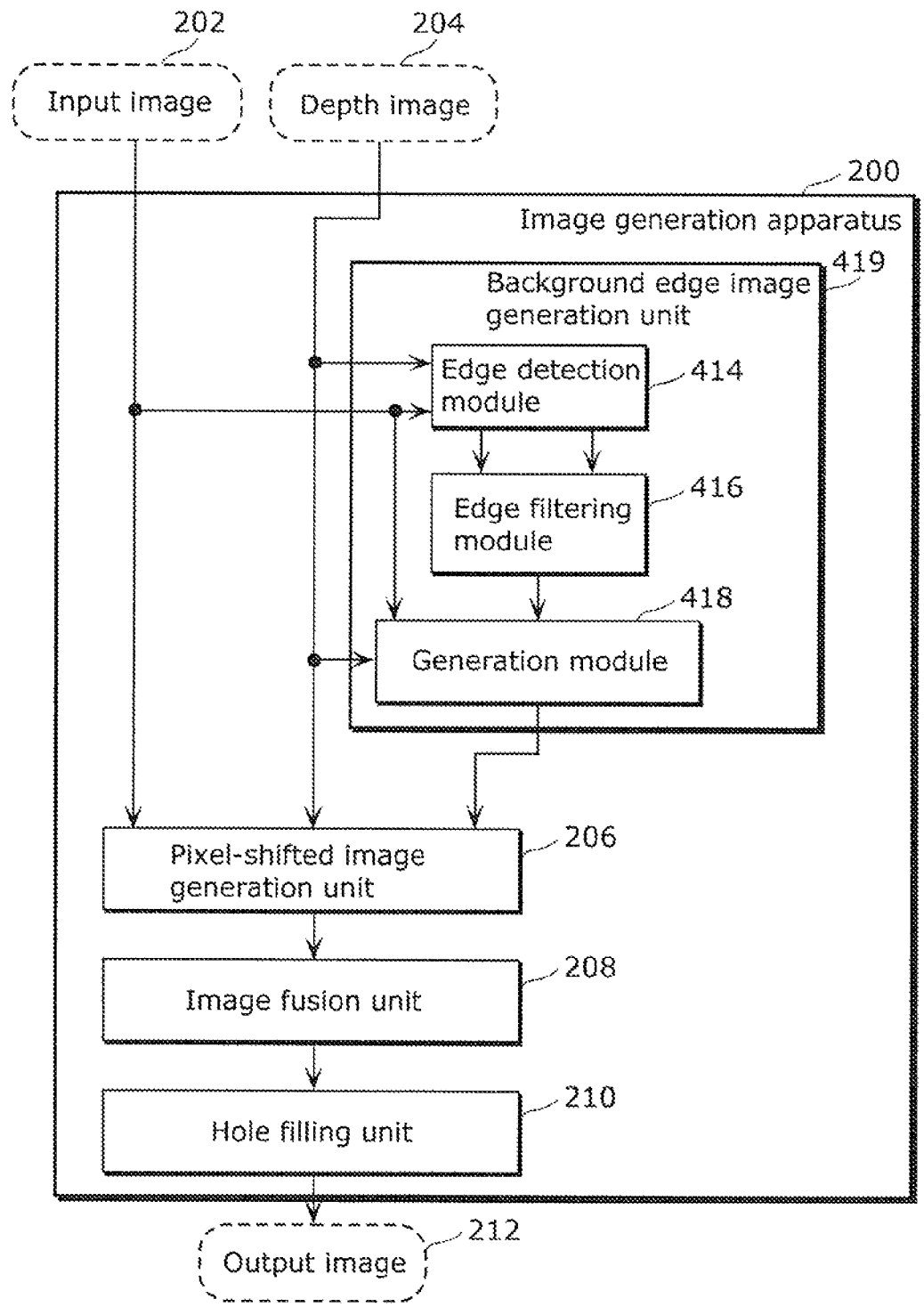
FIG. 6 is a block diagram illustrating an apparatus for generating a new image view according to an embodiment of the present invention.

FIG. 6 illustrates another example of the block diagram of the image generation apparatus 200 according to this embodiment. A difference form the image generation apparatus 200 shown in FIG. 4 is that a background edge image generation unit 419 is further provided.

As shown in FIG. 6, the background edge image generation unit 419 includes: an edge detection module 414 which detects an edge included in the input image and an edge included in the depth map; an edge filtering module 416 which aligns a first edge image indicating edge information included in the input image with a second edge image indicating edge information included in the depth map; and a generation module 418 which generates a background edge image by replacing, based on the edge included in the input image after aligning and the edge included in the depth map after aligning, a pixel value of the edge included in the input image with a pixel value of a pixel indicating a maximum depth position within a predetermined range from, on the depth map, a position corresponding to a position of the edge included in the input image.

Furthermore, the edge filtering module 416 may determine (i) a first edge pixel indicating the edge within a predetermined region in one of the first edge image and the second edge image, and (ii) a second edge pixel that is closest in distance to the first edge pixel among pixels indicating the edge within the predetermined region in the other of the first edge image and the second edge image. In this case, the edge filtering module 416 aligns the first edge image and the second edge image by matching a position of one of the first edge pixel and the second edge pixel to a position of the other.

More detailed descriptions are given below.

The edge detection module 414 obtains the input image 202 and the depth map 204 and generates the first edge image of the input image 202 and the second edge image of the depth map 204. The first and second edge images contain designated edge pixels.

The edge filtering module 416 obtains the first and second edge images and filters the second edge image using information on both the first and second edge images, to generate a filtered edge image containing the designated edge pixels. By doing so, the boundary noise between the foreground object and the background object is filtered out and the edge error in the second edge image is corrected.

Here, in the filtered first and second edge images, each of the edges has two or more pixels in a width direction. Furthermore, among the pixels of each of the edges in the width direction, at least one pixel is included in the foreground object, and at least one other pixel is included in the background region.

The generation module 418 generates the background edge image based on the filtered edge image using the input image and the depth map. In the generation method, a minimum depth position is detected in the corresponding neighborhood of a designated edge pixel in the filtered edge image, and the designated edge pixel is replaced with a pixel intensity value of the input image that corresponds to the minimum depth position.

The pixel-shifted image generation unit 206 generates the first pixel-shifted image and the second pixel-shifted image. The first pixel-shifted image is generated using the input image and the depth map. The second pixel-shifted image is generated using the background edge image and the depth map. The second pixel-shifted image contains the designated edge pixels obtained from the pixels of the background region around the edges of foreground objects. It is to be noted that the pixel-shifted image generation unit 206 may calculate the shift amount based on the depth map and at least one parameter indicating a gain of the shift amount.

The image fusion unit 208 may fuse the second pixel-shifted image onto the first pixel-shifted image by replacing a pixel value of the first pixel-shifted image with a corresponding pixel value of the second pixel-shifted image. In more detail, the image fusion unit 208 fuses the second pixel-shifted image onto the first pixel-shifted image so that the background information from the second pixel-shifted image is fused onto the first pixel-shifted image while preserving the shape of foreground objects, and thereby obtains the fused pixel-shifted image. At this time, the image fusion unit 208 may fuse the second pixel-shifted image onto the first pixel-shifted image based on the weighted average of the pixel values.

Finally, the hole filling unit 210 fills the missing pixels in the fused pixel-shifted image utilizing the background information in the fused pixel-shifted image, to obtain an output image 412. Here, the hole filling unit 210 may fill the hole with the pixel information by performing a total variation (TV) inpainting process on the fused pixel-shifted image. In more detail, the hole filling unit 210 may fill the hole with the pixel information in the TV inpainting process based on a change rate of pixel values which is computed using neighborhood pixels. This allows the hole filling unit 210 to more efficiently fill the hole with pixel values.

In the edge detection module 414, the known edge detectors can be used. For example, the edge detection module 414 may include an edge detector included in the group of Canny edge detector, Prewitt edge detector, Sobel edge detector, Laplacian of Gaussian edge detector, and other differential edge detector, or include a modified edge detector based on the above group.

Figure 7:
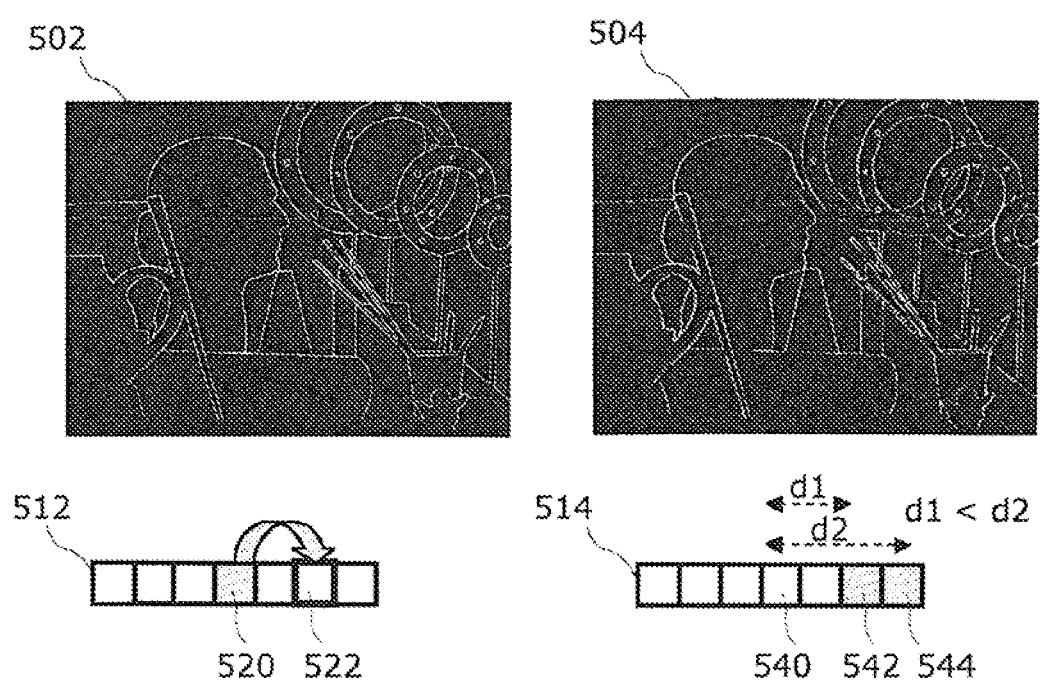
FIG. 7 is an illustration of edge image filtering for generating filtered edge images.

FIG. 7 shows an example of an edge detection result and edge filtering in this embodiment. An image 502 is an example of the second edge image obtained from the depth map. An image 504 is an example of the first edge image (after pre-filtering (not shown)) obtained from the input image.

With reference to FIG. 7, the edge filtering module 416 extracts a pixel column (set) 512 from the image 502, i.e., an edge image obtained from the depth map. A center position 520 is an edge pixel position. Furthermore, the edge filtering module 416 extracts a pixel column (set) 514 from the edge image 504. A center position 540 is the same as the center position 520.

Next, the edge filtering module 416 calculates a distance between the center position 540 and each edge pixel in the pixel column (set) 514. For example, there are two edge pixels in the pixel column (set) 514, such as a pixel 542 and a pixel 544. The edge filtering module 416 calculates a distance d1 between the center position 540 and the pixel 542 and a distance d2 between the center position 540 and the pixel 544. In this case, there is a two-pixel depth error because the edges of an object in the set 512 and in the set 514 do not match. This means that the edge in the depth map 502 is off by two pixels. In order to correct this error, the edge filtering module 416 computes the closest distance between the center position 540 and an edge pixel position in the set 514. In this example, d1 is the closest. Therefore, the edge filtering module 416 remaps the edge pixel at the center position 520 into the pixel 522. In this way, the depth error around object boundary can be reduced.

FIG. 8 shows an example of the background edge image which is generated by the background edge image generation unit 419 according to this embodiment.

A window 602 shows a region extracted from the depth map centering at the position of an edge included in the filtered edge image. The generation module 418 determines the minimum depth value of a 3×3 neighborhood 610, comparing to the depth value of a center position 650. In this example, the depth value at a pixel position 652 is minimum. Here, a smaller depth value indicates a farther position.

However, in order to prevent the error, the generation module 418 selects a pixel position 654 which is one-pixel away from the center position 650 across the pixel position 652 having the minimum depth value. It is to be noted that the generation module 418 may select, other than the pixel position 654, a pixel at a position in predetermined distance and direction, from among the pixels having the minimum depth value.

Next, the generation module 418 selects a window 604 from the input image at the same position as the window 602. In this example, one color component is indicated in the input image which is a color image. A center position 660 corresponds to the center position 650, and a pixel position 664 corresponds to the pixel position 654.

The generation module 418 generates the background edge image by replacing the pixel value in the pixel position 660 with the pixel value in the pixel position 664. As a result, the pixel value in a center position 662 is the same as the pixel value in a pixel position 666 as shown in a window 606. In other words, the pixel value in the center position 662 is replaced with the pixel value of a co-located edge in the filtered edge image, to generate the background edge image.

Subsequently, the generation module 418 performs the same process on the pixels on the other edges.

Figure 9:
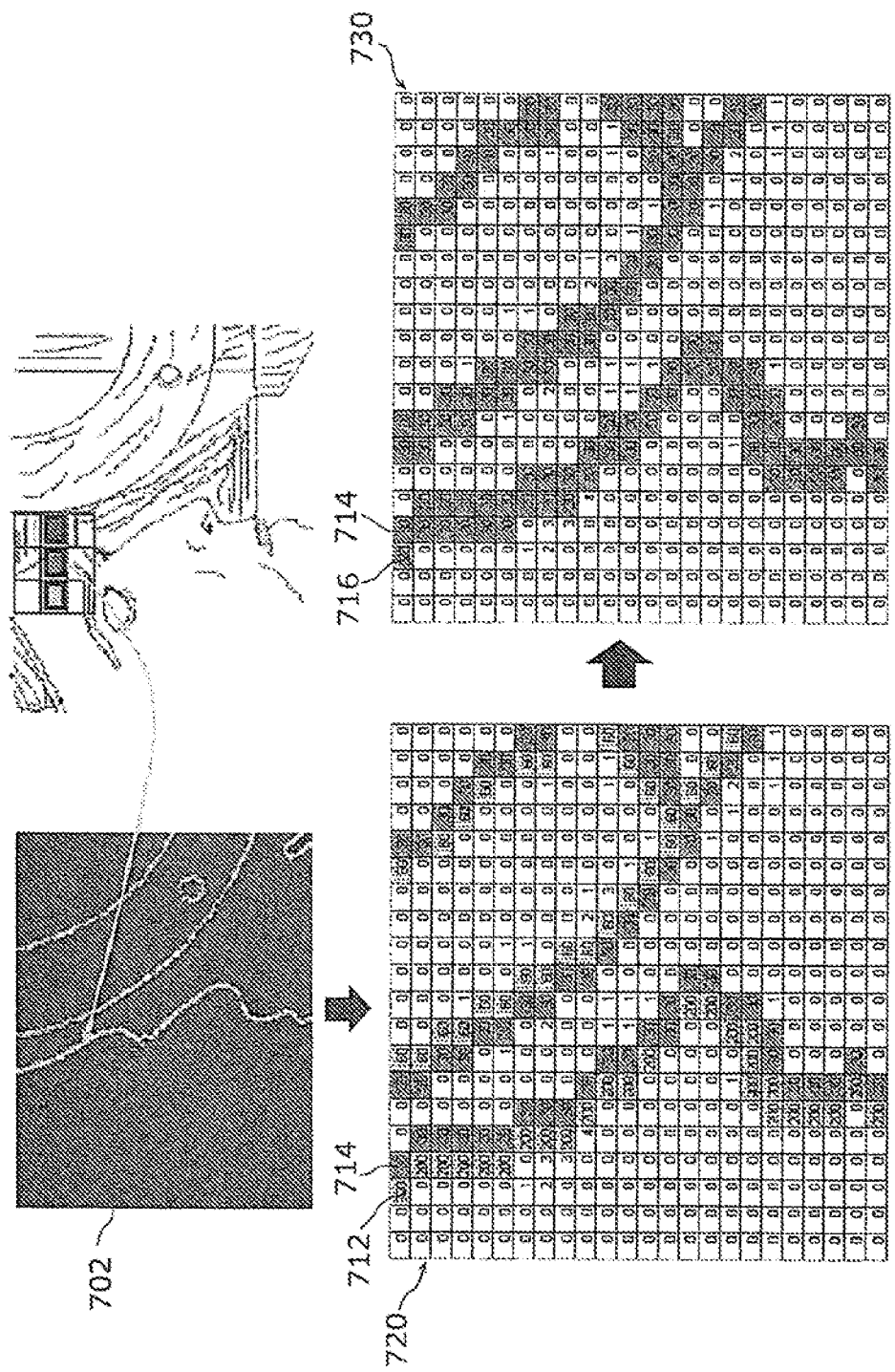
FIG. 9 is an illustration of an example of a generation process for generating the background edge image according to an embodiment of the present invention.

FIG. 9 shows an example of a process of generating a background edge image 730.

A filtered edge image 720 is a filtered edge image with the edge pixel replaced with the pixel value. The filtered edge image 720 contains a foreground pixel 712 and a background pixel 714.

The background edge image 730 has all the foreground pixels along the edges replaced with the background pixels included in the input image. For example, the foreground pixel 712 has been replaced with a background pixel 716.

Figure 10:
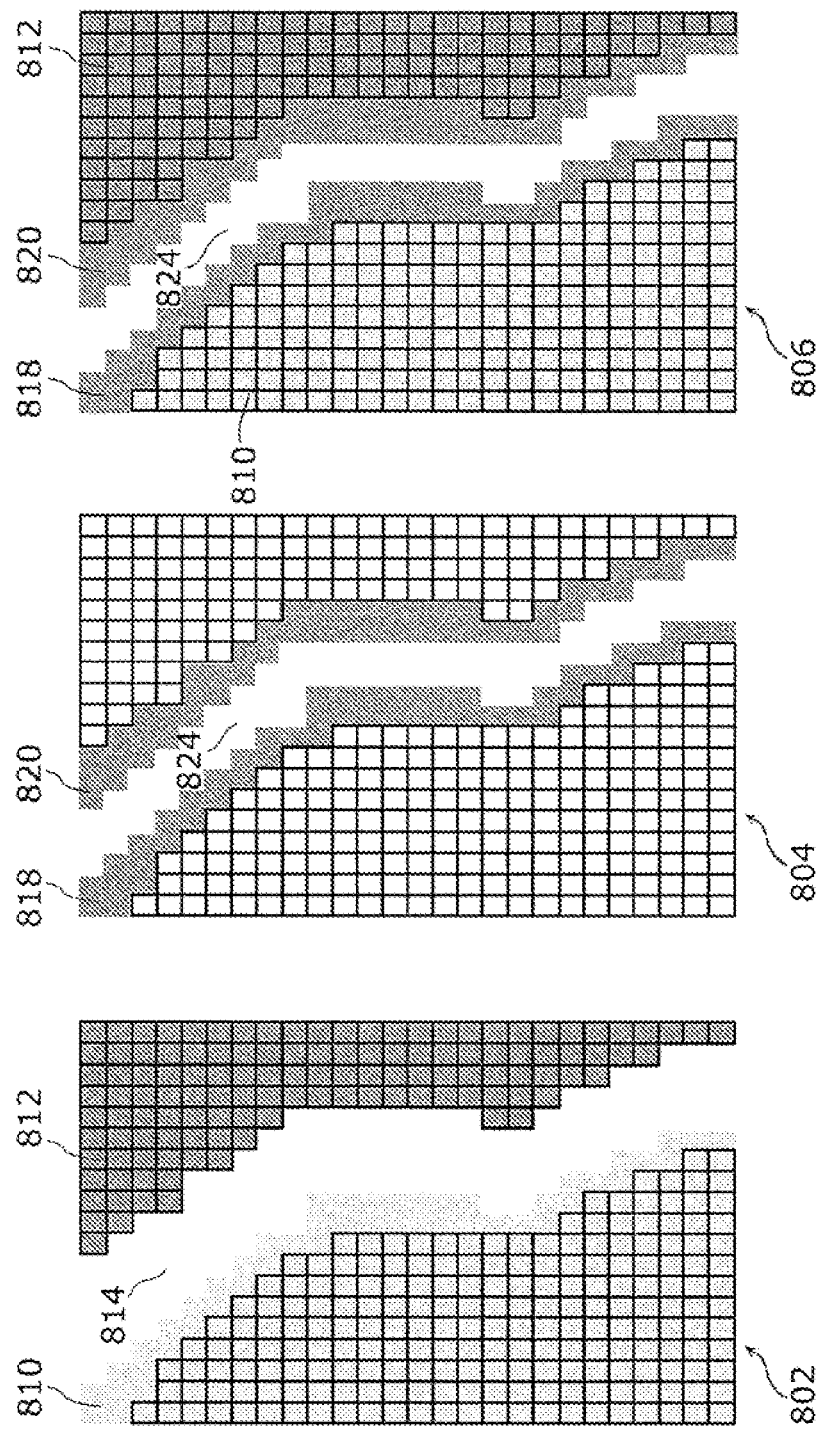
FIG. 10 is an illustration of image fusion according to an embodiment of the present invention.

The pixel-shifted image generation unit 206 generates the first pixel-shifted image and the second pixel-shifted image. FIG. 10 shows exemplary illustration of a first pixel-shifted image 802 and a second pixel-shifted image 804. The pixel shifting is based on the depth map. To generate the pixel-shifted image, the conventional DIBR technique can be used. For example, the method is disclosed in Non-Patent Literatures (NPL) 1 and 2 and so on.

Referring to FIG. 10, a hole 814 and a hole 824 can be created in occlusion regions in the input image. In the first pixel-shifted image 802, the hole 814 is in between a foreground 810 and a background 812. In the second pixel-shifted image 804, the hole 824 is in between a background pixel 818 and a background pixel 820. The second pixel-shifted image 804 is fused onto the first pixel-shifted image to generate a fused shifted image 806. The hole 824 is in between the background pixel 818 and the background pixel 820.

By fusing the pixel-shifted input image and the pixel-shifted background edge image, the both sides of the hole region are surrounded by the background pixels. As a result, even after the hole is filled with the pixel values on the both sides of the hole region, the output synthesized image can preserve the shape of foreground object and have less artifacts.

Referring again to FIG. 10, the hole filling in the region of the hole 824 is carried out by inpainting algorithm such as total variation (TV) inpainting, approximated TV inpainting, fast inpainting, or approximated fast inpainting, etc.

In order to improve inpainting quality by TV inpainting algorithm, the average neighborhood pixel value of the inpaint mask can be computed locally or globally. In this case, a predetermined inpaint parameter a is set if the average pixel value is within a predetermined range. These parameters are set based on each channel of the fused image. As defined herein, the local average neighbor hood pixel value of the inpaint mask is the value that can be computed by separating each of local regions in the fused image. The global average neighborhood pixel value of the inpaint mask is the value that can be computed by considering the whole region of fused image. The average neighborhood pixel is used to estimate the inpainting parameter a.

For each channel of the fused image, the inpaint parameter a is defined by the following Expression (1).

[Math. 1]

If(average pixel value>threshold_1),  Expression (1)
    parameter a = value_1,
elseif(average pixel value<threshold_1 & average pixel value>threshold_2)
    parameter a = value_2,
else
    parameter a = value_3, In approximated TV inpainting, the diffusion rate of inpainting pixel values is improved by setting the parameter $\lambda$, $\chi t$ to constant number. In addition, these parameter $\lambda$, $\chi t$ terms speed up the diffusion rate by adding the change rate of diffused pixel values. As a result, the incomplete interpolation due to a large hole region can be avoided, and a more complete interpolated pixel value is achieved.

The inpainting formula is as indicated in the following Expression (2).

[Math. 2]

$$div(b\nabla u)_{ij} \approx \left(b_{i-\frac{1}{2},j}u_{i-1,j} + b_{i+\frac{1}{2},j}u_{i+1,j} + b_{ij-\frac{1}{2}}u_{ij-1} + b_{ij+\frac{1}{2}}u_{ij+1} - \left(b_{i-\frac{1}{2},j} + b_{i+\frac{1}{2},j} + b_{ij-\frac{1}{2}} + b_{ij+\frac{1}{2}}\right)u_{ij}\right) \approx 0$$

$$b_{i+\frac{1}{2},j} \approx \frac{1}{\sqrt{(u_{i+1,j} - u_{ij})^2 + \frac{1}{16}(u_{i+1,j+1} + u_{ij+1} - u_{i+1,j-1} - u_{ij-1})^2 + a}}$$

$$b_{i-\frac{1}{2},j} \approx \frac{1}{\sqrt{(u_{i-1,j} - u_{ij})^2 + \frac{1}{16}(u_{i-1,j+1} + u_{ij+1} - u_{i-1,j-1} - u_{ij-1})^2 + a}}$$

$$b_{ij+\frac{1}{2}} \approx \frac{1}{\sqrt{(u_{ij+1} - u_{ij})^2 + \frac{1}{16}(u_{i-1,j} + u_{i-1,j+1} - u_{i+1,j} - u_{i+1,j+1})^2 + a}}$$

$$b_{ij-\frac{1}{2}} \approx \frac{1}{\sqrt{(u_{ij-1} - u_{ij})^2 + \frac{1}{16}(u_{i-1,j} + u_{i-1,j-1} - u_{i+1,j} - u_{i+1,j-1})^2 + a}}$$

$$u_{ij}^{n+1} = \frac{b_{i-\frac{1}{2},j}u_{i-1,j}^n + b_{i+\frac{1}{2},j}u_{i+1,j}^n + b_{ij-\frac{1}{2}}u_{ij-1}^n + b_{ij+\frac{1}{2}}u_{ij+1}^n}{\left(b_{i-\frac{1}{2},j} + b_{i+\frac{1}{2},j} + b_{ij-\frac{1}{2}} + b_{ij+\frac{1}{2}}\right)} + \lambda(u_{ij}^n - u_{ij}^{n-1}) + \chi t(u_{ij}^n - u_{ij}^{n-1})$$

$$\chi t = \left(Log_2\left(\frac{n+1}{n}\right)\right)$$

Here, a is a parameter set by the average neighborhood pixel, parameters $\lambda$, $\chi t$ are fast converging parameters to speed up the diffusion rate, and n is the iteration number. Furthermore, what is indicated in Expression (3) is a new pixel value, and b is a numerical function to do the averaging.

[Math. 3]

$$u_{i,j}^{n+1}$$  Expression (3)

In general, any inpainting algorithm that utilizes iteration is approximated by the following Expression (4).

[Math. 4]

$$I^{n+1} = I^n \otimes A + \delta t(I^{n+1} - I^n) + \chi t(I^{n+1} - I^n)$$  Expression (4)

$$\chi t = \left(Log_2\left(\frac{n+1}{n}\right)\right)$$

Here, $I^{n+1}$ is the new pixel value, kernel A refers to coefficients calculated by the corresponding inpainting method, the parameters $\lambda$, $\chi t$ are fast converging parameters to speed up the diffusion rate, and n is the iteration number.

Figure 14:
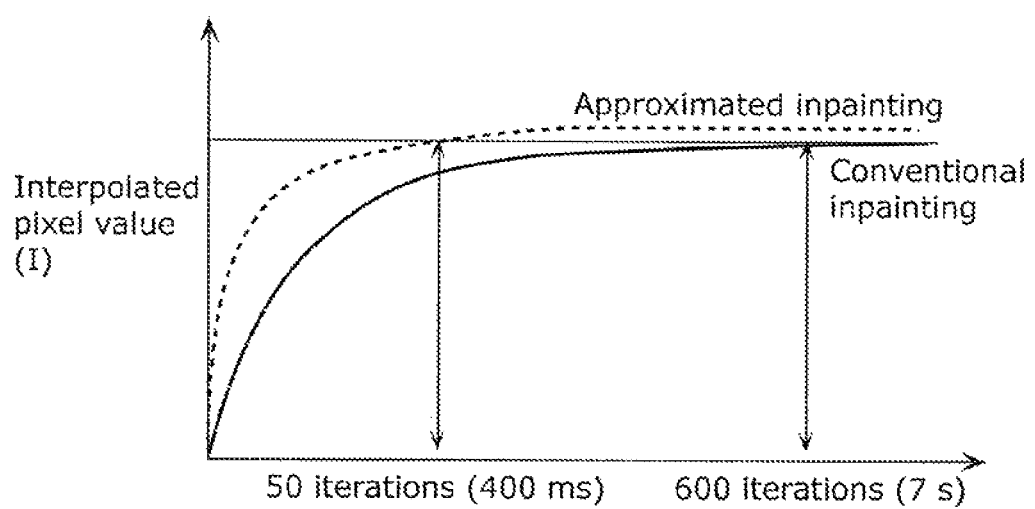
FIG. 14 is a graph showing a convergence rate of inpainting according to an embodiment of the present invention.

As shown in FIG. 14, in the conventional inpainting algorithm, numerous iterations are required to reach the saturated inpainting pixel value with which the Evaluation index indicating the degree of inpainting of pixel values is saturated. In contrast, in the inpainting algorithm indicated by the above Expression 2, the iterations to reach the saturated inpainting pixel value are fewer, and the complexity of approximated inpainting is therefore low. As a result, the inpainting quality is maintained except for slight differences in their intensity and processing speed is greatly improved.

It is to be noted that the hole filling unit 210 may further perform, on the fused pixel-shifted image which has the hole filled by the hole filling unit 210, a process of smoothing the boundary of the foreground object based on the similarity of pixel values around the boundary and the depth degree indicated by the depth map. Specific descriptions are given below with reference to FIG. 13.

Figure 13:
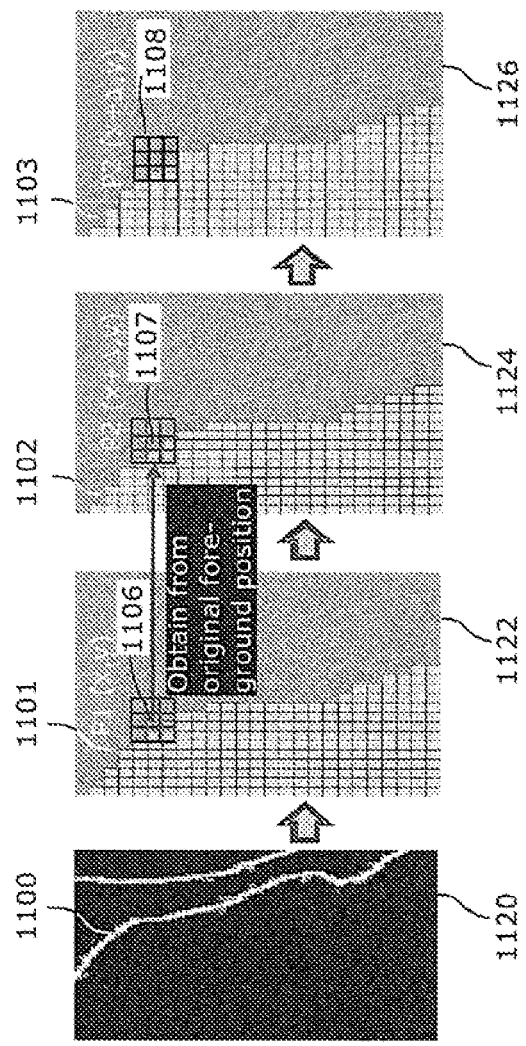
FIG. 13 is an illustration of a foreground edge remapping method according to an embodiment of the present invention.

FIG. 13 is an illustration of a foreground edge remapping method which is performed by the hole filling unit 210 according to an embodiment of the present invention. In remapping of the original edge pixel module, a filtered foreground edge image 1120 is used to extract the determined size of block centering on P2(x+Δ,y) at the edge of an inpainted image 1124. The previously stored original pixel position of background edge is used to remap the determined size of block centering on P1(x,y) at the edge of input texture image into a block centering on P2(x+Δ,y) at the edge of the inpainted image. It is clear that a synthesized image 1126 has smooth boundary as those of an input image 1122. This is because all the original foreground pixels are restored back to the synthesized image.

It was found that, during remapping of the original edge pixels, artifacts are reduced depending on the pixels values indicating the color intensity, and the degree of depth, of two blocks at the corresponding positions. The matching of blocks is computed by the following Expression (5).

[Math. 5]
$$SSD = \sum_n \sum_{i,u}^{M} \sum_{j,v}^{N} (I(i,j,n) - I_{org}(u,v,n))^2 + \sum_{i,u}^{M} \sum_{j,v}^{N} (depth(i,j) - depth_{org}(u,v))^2 \quad \text{Expression (5)}$$

Here, SSD means the sum of similarity differences, and n, M, N represent the channel and the size of a synthesized image, I represents image information on the inpainted image, $I_{org}$ represents image information on the input texture image, $depth_{org}$ represents image information on the input depth image, and depth represents image information on the inpainted depth image.

As shown in FIG. 13, a foreground edge 1100 (1101, 1102, 1103) is detected from the inpainted depth map. Using the foreground edge, the pixel values included in a window 1106 centering on P1(x, y) from the input texture image are copied onto the corresponding pixel values included in a window 1107 centering on P2(x+Δ,y) from the inpainted image. As a result, the pixel values included in the window 1107 are shown in a window 1108. As shown in a window 1108, after edge remapping, all the foreground edges are the same as the foreground edges of the input texture image, and the synthesized image is outputted.

Figure 11:
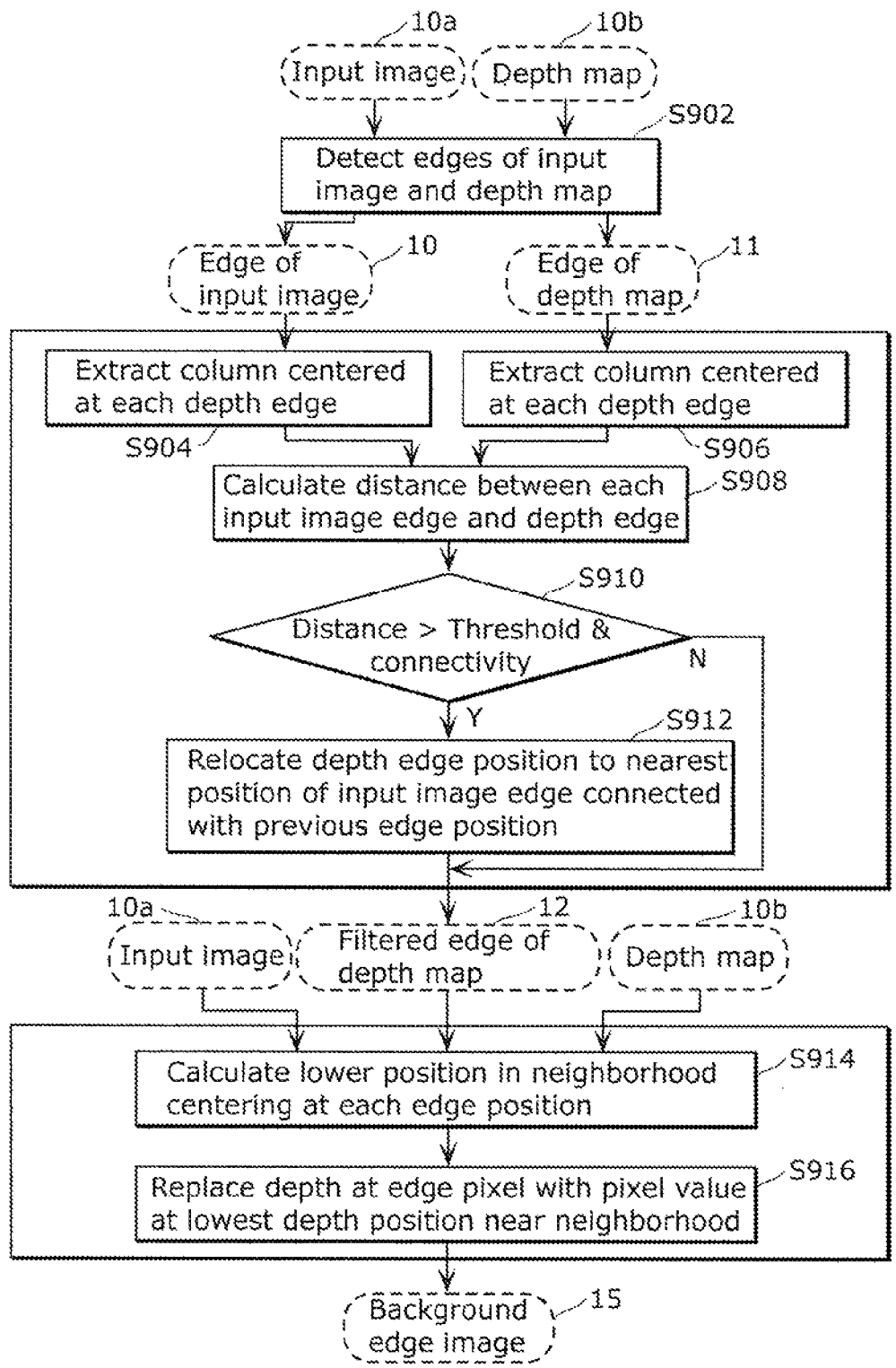
FIG. 11 is a flowchart illustrating a detailed method of background edge image generation according to an embodiment of the present invention.

FIG. 11 shows a detailed flowchart of the method for generating the background edge image according to this embodiment.

The edge detection module 414 detects edges of an input image 10a to generate an edge image 10 and detects edges of a depth map 10b to generate an edge image 11 at Step S902.

Next, the edge filtering module 416 extracts input image edges 10 centered at each depth map edge 11 at Step S904. Furthermore, at Step S906, the edge filtering module 416 extracts an edge image column centered at each depth map edge 11. Next, at Step S908, the edge filtering module 416 calculates a distance between each pixel included in the input image edges 10 and a pixel included in the depth map edge 11. The edge filtering module 416 determines at Step S910 whether or not this distance is longer than a threshold and meets a connectivity criterion. Here, the connectivity means spatial connectivity with other edges. For example, it is usually unlikely that an edge for a few pixels exists at a position away from the other edges. In this case, information on the pixel located away from the other edges is determined as noise.

When it is determined as Yes at Step S910, the edge filtering module 416 relocates a depth edge position to the nearest position of an input image edge connected with a previous edge position at Step S912. By doing so, a filtered edge image 12 is obtained.

When it is determined as No at Step S910, the edge filtering module 416 does not perform the process at Step S912.

Next, the generation module 418 calculates, at Step S914, a lower depth position in the neighborhood centering at each edge position. Subsequently, the generation module 418 replaces a depth at an edge pixel with a pixel value at the lowest depth position near the neighborhood at Step S916. By doing so a background edge image 15 is finally obtained.

Figure 12:
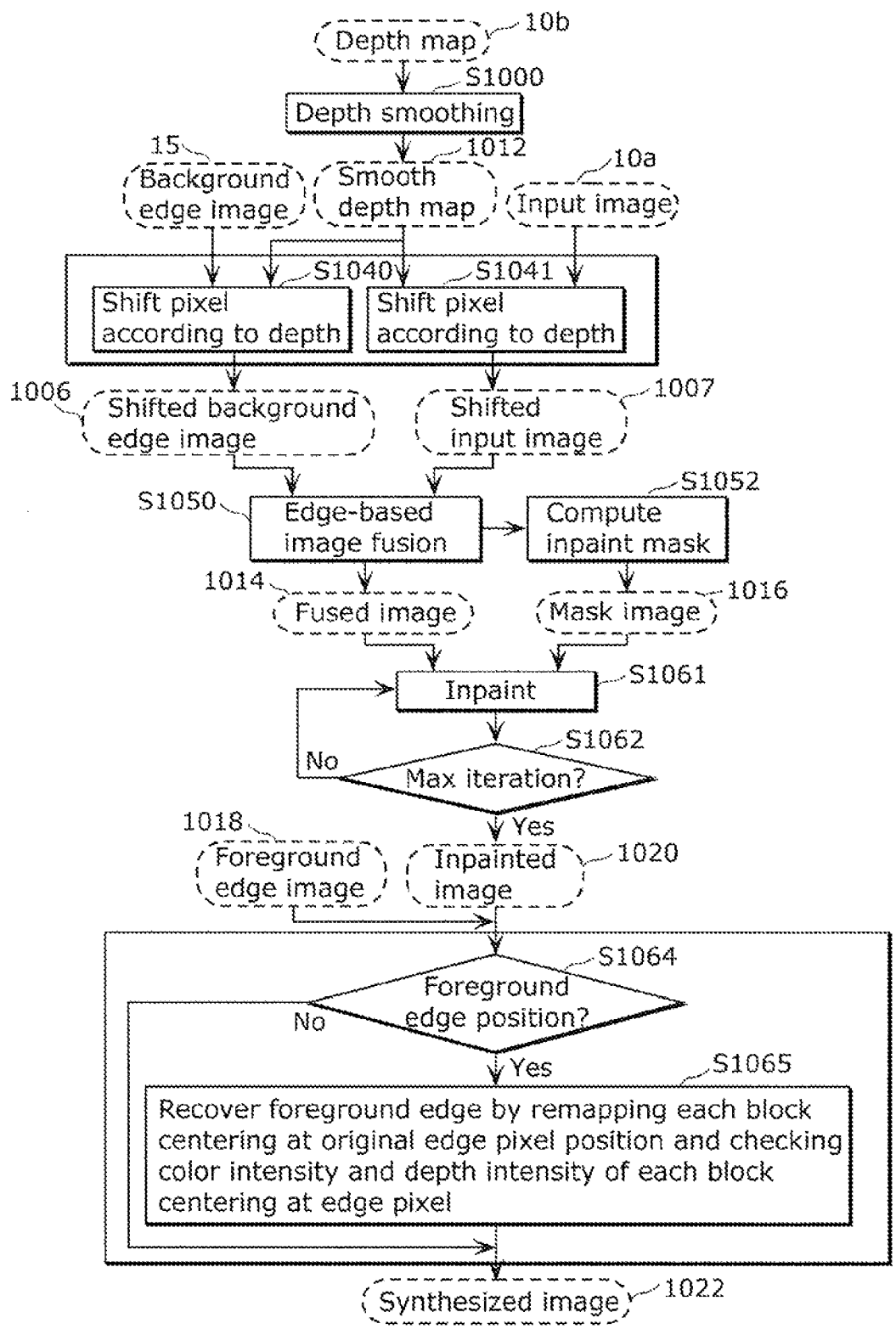
FIG. 12 is a flowchart illustrating a detailed method for generating a new image view according to an embodiment of the present invention.

FIG. 12 is a flowchart illustrating a method for generating a new image view according to this embodiment.

First, the pixel-shifted image generation unit 206 obtains the background edge image 15 generated by the method shown in FIG. 11, the input image 10a, and a smooth depth map 1012 that is obtained by smoothing the depth of the depth map 10b (S1000).

Subsequently, the pixel-shifted image generation unit 206 shifts each of the pixels in the background edge image 15 and the input image 10a by a predetermined amount based on the corresponding depth information (S1040, S1041).

Next, the image fusion unit 208 fuses a shifted background edge image 1006 and a shifted input image 107 such that their edges overlap (S1050), to obtain a fused image 1014. Furthermore, an inpaint mask is computed in order to inpaint the hole (S1052), and a mask image 1016 is thus generated.

Subsequently, the hole filling unit 210 repeats the hole inpainting (that is, filling missing parts of the pixel information) up to the maximum iteration number (S1061, S1062) and thereby generates an inpainted image 1020 with the hole filled in.

It is to be noted that the hole filling unit 210 may more accurately inpaint, based on a foreground edge image 1018, edge parts included in the inpainted image 1020 (S1064, S1065).

By doing so, the image generation apparatus 200 generates a synthesized image 1022.

Figure 15:
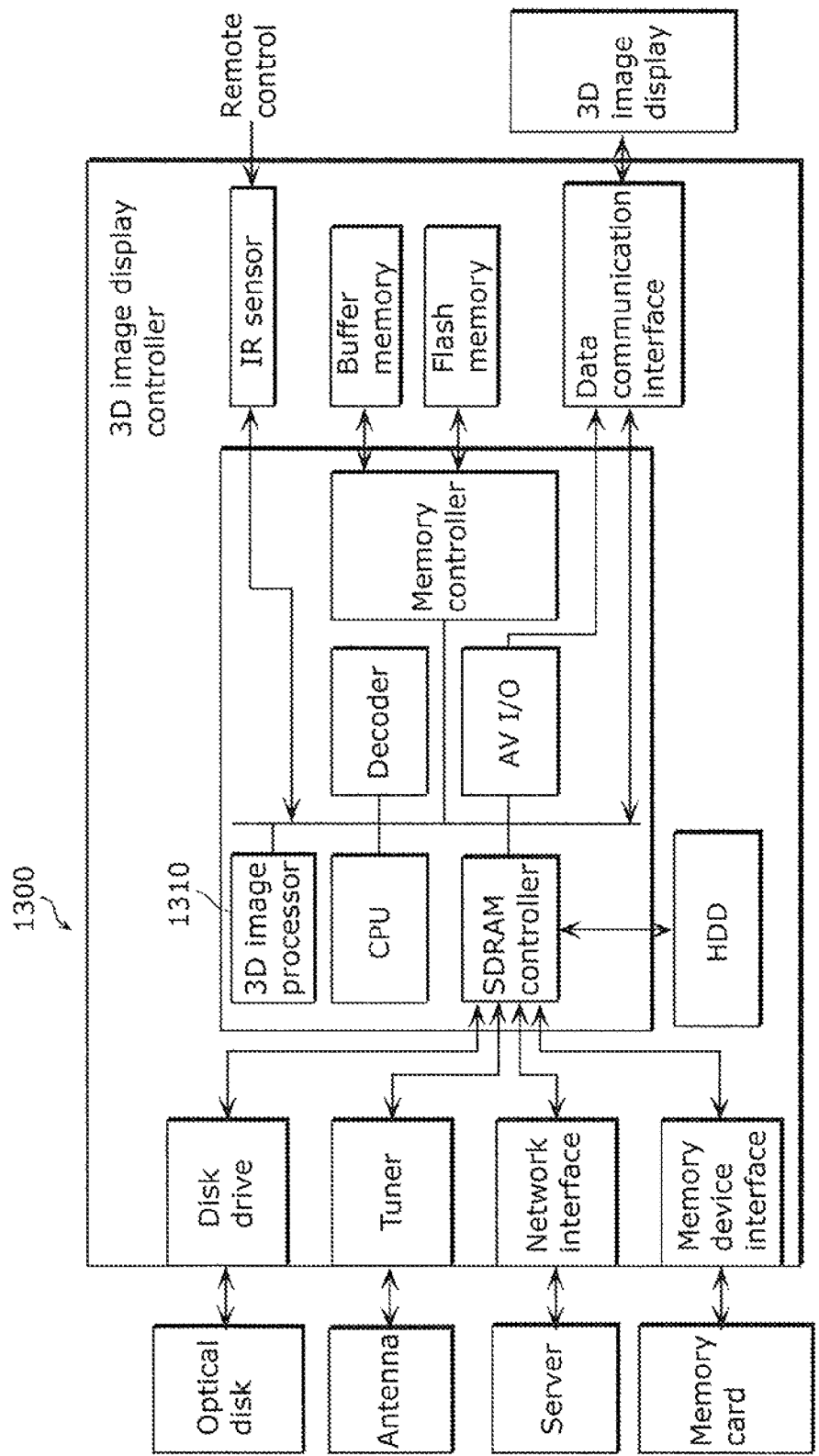
FIG. 15 is a block diagram of a display apparatus embedded with an apparatus for generating a new image view according to the present invention.

FIG. 15 is a block diagram of a display apparatus 1300 which includes a 3D image processor 1310 embedded with the image generation apparatus 200 according to this embodiment. The 3D image processor 1310 supplies the input image and the depth map to the image generation apparatus 200 embedded within the processor to generate 3D images. The 3D images may be displayed on a display unit of the display apparatus 1300.

The image generation apparatus 200, the 3D image processor 1310, and other modules within the processor are typically achieved in the form of integrated circuits (IC), application-specific integrated circuits (ASIC), large scale integrated (LSI) circuits, and digital signal processors (DSP). Each of these modules can be in many single-function LSIs, or also can be in one integrated LSI. The name used here is LSI, but it may also be called IC, system LSI, super LSI, or ultra LSI in accordance with the degree of integration. Moreover, ways to achieve integration is not only LSI, but also special circuit or general purpose processor and so forth can achieve the integration. This includes a specialized microprocessor such as a digital signal processor (DSP) that can be directed by the program instruction. A field programmable gate array (FPGA) that can be programmed after manufacturing LSI or reconfigurable processor that can re-configure the connection or configuration of LSI can be used for the same purpose. In the future, with advancement in manufacturing and process technology, a brand-new technology may replace LSI. The integration can be done by that technology.

It is to be noted that the each of the structural elements in the above-described embodiment may be configured in form of an exclusive hardware product, or may be realized by executing a software program suitable of the structural element. Each of the structural elements may be realized by means that a program executing unit such as a CPU and a processor reads and executes the software program recorded on a recording medium such as a hard disc or a semiconductor memory.

Although the image generation apparatus according to an implementation of the present invention has been described above based on the embodiment, the present invention is not limited to the embodiment. The scope of an implementation of the present invention may include, without departing from the principles and spirit thereof, an embodiment obtained by making various modifications that those skilled in the art could think of, to the embodiment, or an embodiment obtained by a given combination of structural elements in different embodiments.

The images shown in FIGS. 7, 9 etc. are based on the original images which are included in the following papers.

(1) D. Scharstein and C. Pal. Learning conditional random fields forstereo. In IEEE Computer Society Conference on Computer Vision and Pattern Recognition (CVPR 2007), Minneapolis, Minn., June 2007. (Non-Patent Literature 3)

(2) H. Hirschmuller and D. Scharstein. Evaluation of cost functions for stereo matching. In IEEE Computer Society Conference on Computer Vision and Pattern Recognition (CVPR 2007), Minneapolis, Minn., June 2007. (Non-Patent Literature 4)

[Industrial Applicability]

The present invention is usable in an image generation apparatus and the like. In particular, the present invention is usable in an image generation apparatus or the like which generates, based on an input image and a depth map corresponding to the input image, a new image of a new viewpoint of a scene represented in the input image.

[Reference Signs List]
10 Edge of input image
11 Edge of depth map
12 Filtered edge of depth map
15, 730 Background edge image
100, 200 Image generation apparatus
102 Texture analysis
104 Edge detection
106 Depth scaling
108 Rendering unit
202, 10a, 1122 Input image
204, 10b, 502 Depth map
206 Pixel-shifted image generation unit
208 Image fusion unit
210 Hole filling unit
212, 412, 1022, 1126 Output image (synthesized image)
414 Edge detection module
416 Edge filtering module
418 Generation module
419 Background edge image generation unit
502, 504 Image
504, 702 Edge image
512, 514 Set
520, 540, 650, 660, 662 Center position
522, 542, 544 Pixel
602, 604, 606, 1106, 1107 1108 Window
610 Neighborhood
652, 654, 660, 664, 666 Pixel position
712 Foreground pixel
714, 716, 818, 820 Background pixel
720 Filtered edge image
802, 1007 First pixel-shifted image (shifted input image)
804, 1006 Second pixel-shifted image (shifted background edge image)
806, 1014 Shifted fused image
810 Foreground
812 Background
814, 824 Hole
1012 Smooth depth map
1016 Mask image
1018, 1120 Foreground edge image
1020, 1124 Inpainted image
1100, 1101, 1102, 1103 Foreground edge
1300 Display device
1310 3D image processor

The invention claimed is:

1. An image generation apparatus for generating, based on an input image and a depth map corresponding to the input image, an image of a new viewpoint of a scene represented in the input image, the apparatus comprising:
a processor;
a pixel-shifted image generation unit configured to generate, using the processor, a first pixel-shifted image and a second pixel-shifted image, the first pixel-shifted image resulting from a process of shifting, based on the input image and the depth map, a pixel in the input image by a shift amount corresponding to the new viewpoint, the second pixel-shifted image resulting from a process of shifting a pixel in a background edge image by the same shift amount as for the first pixel-shifted image, and the background edge image being included in the input image and containing a designated edge pixel that is a pixel located in a background region around an edge of a foreground object;
an image fusion unit configured to fuse the second pixel-shifted image and the first pixel-shifted image to include a background region in the second pixel-shifted image into a hole that is a region having no pixel information and created in the first pixel-shifted image in the process of shifting the pixel; and
a hole filling unit configured to fill the hole with pixel information based on the fused pixel-shifted image.

2. The image generation apparatus according to claim 1, further comprising
a background edge image generation unit including:
an edge detection module which detects an edge included in the input image and an edge included in the depth map;
an edge filtering module which aligns a first edge image and a second edge image, the first edge image indicating edge information included in the input image, and the second edge image indicating edge information included in the depth map; and a generation module which generates the background edge image by replacing, based on the edge included in the input image after the aligning and the edge included in the depth map after the aligning, a pixel value of the edge included in the input image with a pixel value of a pixel indicating a maximum depth position within a predetermined range from, on the depth map, a position corresponding to a position of the edge included in the input image.

3. The image generation apparatus according to claim 2, wherein the edge filtering module determines a first edge pixel and a second edge pixel, and aligns the first edge image and the second edge image by matching a position of one of the first edge pixel and the second edge pixel to a position of the other, the first edge pixel indicating the edge within a predetermined region in one of the first edge image and the second edge image, and the second pixel being closest in distance to the first edge pixel among pixels indicating the edge within the predetermined region in the other of the first edge image and the second edge image.

4. The image generation apparatus according to claim 2, wherein, in each of the first edge image and the second edge image, the edge has two or more pixels in a width direction.

5. The image generation apparatus according to claim 4, wherein, among the pixels of the edge in the width direction, at least one pixel is included in the foreground object, and at least one other pixel is included in the background region.

6. The image generation apparatus according to claim 2, wherein the edge detection module includes an edge detector included in a group of a Canny edge detector, a Prewitt edge detector, a Sobel edge detector, a Laplacian of Gaussian edge detector, and other differential edge detectors.

7. The image generation apparatus according to claim 1, wherein the pixel-shifted image generation unit is configured to calculate the shift amount based on the depth map and at least one parameter indicating a gain of the shift amount.

8. The image generation apparatus according to claim 1, wherein the image fusion unit is configured to fuse the second pixel-shifted image onto the first pixel-shifted image by replacing a pixel value of the first pixel-shifted image with a corresponding pixel value of the second pixel-shifted image.

9. The image generation apparatus according to claim 1, wherein the image fusion unit is configured to fuse the second pixel-shifted image onto the first pixel-shifted image based on a weighted average of pixel values.

10. The image generation apparatus according to claim 1, wherein the hole filling unit is configured to fill the hole with the pixel information by performing a total variation (TV) inpainting process on the fused pixel-shifted image.

11. The image generation apparatus according to claim 10, wherein the hole filling unit is configured to fill the hole with the pixel information in the TV inpainting process based on a change rate of pixel values which is computed using neighborhood pixels.

12. The image generation apparatus according to claim 1, wherein the hole filling unit is further configured to perform, on the fused pixel-shifted image which has the hole filled by the hole filling unit, a process of smoothing a boundary of the foreground object based on a similarity of pixel values around the boundary and a depth degree indicated by the depth map.

13. An image generation method for generating, based on an input image and a depth map corresponding to the input image, an image of a new viewpoint of a scene represented in the input image, the method comprising:

generating, using a processor, a first pixel-shifted image and a second pixel-shifted image, the first pixel-shifted image resulting from a process of shifting, based on the input image and the depth map, a pixel in the input image by a shift amount corresponding to the new viewpoint, the second pixel-shifted image resulting from a process of shifting a pixel in a background edge image by the same shift amount as for the first pixel-shifted image, and the background edge image being included in the input image and containing a designated edge pixel that is a pixel located in a background region around an edge of a foreground object;

fusing the second pixel-shifted image and the first pixel-shifted image to include a background region in the second pixel-shifted image into a hole that is a region having no pixel information and created in the first pixel-shifted image in the process of shifting the pixel; and filling the hole with pixel information based on the fused pixel-shifted image.

14. A non-transitory computer-readable recording medium having recorded thereon a program for causing a computer to execute the image generation method according to claim 13.

15. An integrated circuit executing the image generation method according to claim 13.

* * * * *